(12) United States Patent
Val et al.

(10) Patent No.: US 12,115,905 B2
(45) Date of Patent: Oct. 15, 2024

(54) LIGHTING MODULE FOR A MOTOR VEHICLE

(71) Applicant: VALEO VISION, Bobigny (FR)

(72) Inventors: Alexandre Val, Bobigny (FR); Samuel Daroussin, Bobigny (FR); Antoine De Lamberterie, Bobigny (FR); Zdravko Zojceski, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/247,008

(22) PCT Filed: Sep. 30, 2021

(86) PCT No.: PCT/EP2021/077025
§ 371 (c)(1),
(2) Date: Mar. 28, 2023

(87) PCT Pub. No.: WO2022/069675
PCT Pub. Date: Apr. 7, 2022

(65) Prior Publication Data
US 2023/0365055 A1 Nov. 16, 2023

(30) Foreign Application Priority Data

Sep. 30, 2020 (FR) ........................................ 2010016

(51) Int. Cl.
*B60Q 1/50* (2006.01)
*B60Q 1/26* (2006.01)
(Continued)

(52) U.S. Cl.
CPC ......... *B60Q 1/5035* (2022.05); *B60Q 1/2696* (2013.01); *F21S 43/145* (2018.01); *F21S 43/195* (2018.01)

(58) Field of Classification Search
CPC ... F21V 19/001; F21V 19/0015; F21V 19/005
See application file for complete search history.

(56) References Cited

U.S. PATENT DOCUMENTS 6,152,590 A * 11/2000 Furst ........................ F21S 43/14
362/546
2002/0053878 A1* 5/2002 Masaki .................... B60Q 1/44
315/77

(Continued)

FOREIGN PATENT DOCUMENTS

DE 103 15 133 A1 10/2004
EP 1 732 144 A2 12/2006
(Continued)

OTHER PUBLICATIONS

International Search Report mailed on Jan. 7, 2022 in PCT/EP2021/077025 filed on Sep. 30, 2021, 2 pages.

*Primary Examiner* — Eric T Eide
(74) *Attorney, Agent, or Firm* — Oblon, McClelland, Maier & Neustadt, L.L.P.

(57) ABSTRACT

A lighting module for a motor vehicle signaling device includes a substrate provided with an electronic circuit on which a matrix arrangement of elementary light sources is mounted, and wall through which light emitted from the light sources can pass. The substrate and/or all or part of the elementary light sources are bonded to the wall.

19 Claims, 1 Drawing Sheet

Figure 1:
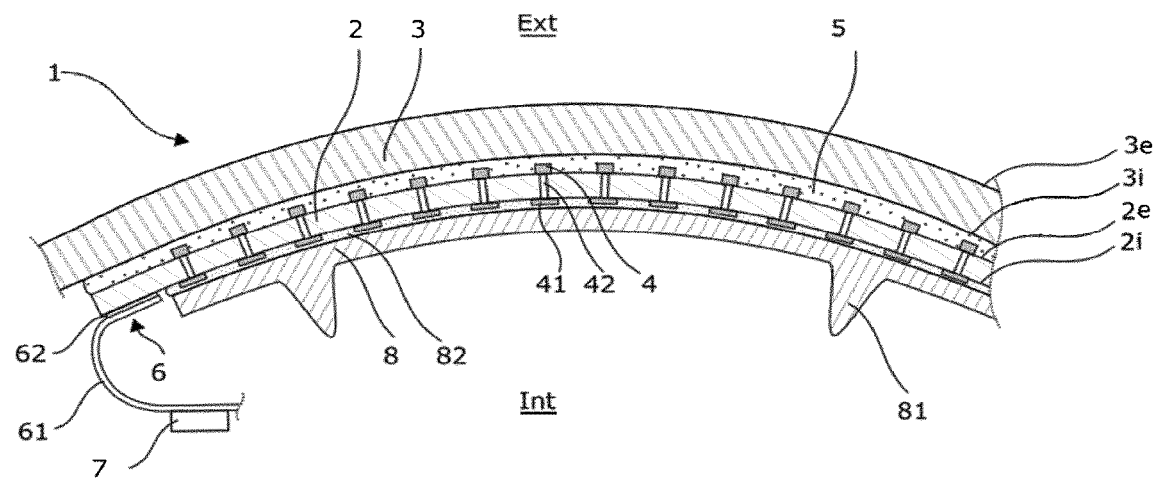

(51) Int. Cl.
*F21S 43/145* (2018.01)
*F21S 43/19* (2018.01)

(56) References Cited

U.S. PATENT DOCUMENTS

| | | |
|---|---|---|
| 2006/0198118 A1 | 9/2006 | Eichhorn et al. |
| 2006/0279949 A1 | 12/2006 | Shin et al. |
| 2012/0113659 A1 | 5/2012 | Hermitte et al. |
| 2014/0043819 A1* | 2/2014 | Yang .................. F21V 17/101 362/268 |
| 2015/0003083 A1* | 1/2015 | Uehara ............... H05K 3/0058 362/418 |
| 2016/0215950 A1 | 7/2016 | Ender et al. |
| 2016/0377785 A1* | 12/2016 | Chestakov ............ F21S 43/239 362/606 |
| 2017/0154920 A1 | 6/2017 | Ono et al. |
| 2019/0331311 A1* | 10/2019 | Crompvoets ........... F21S 43/14 |
| 2020/0041085 A1 | 2/2020 | Miyairi et al. |
| 2020/0271308 A1* | 8/2020 | Yasutake ............... F21V 23/004 |
| 2020/0393103 A1 | 12/2020 | Miyairi et al. |
| 2023/0220968 A1* | 7/2023 | Ko ........................ F21S 43/26 362/517 |

FOREIGN PATENT DOCUMENTS

| | | |
|---|---|---|
| EP | 2 450 622 A2 | 5/2012 |
| EP | 3 608 959 A1 | 2/2020 |
| WO | WO 2014/105408 A2 | 7/2014 |

\* cited by examiner

LIGHTING MODULE FOR A MOTOR VEHICLE

The invention relates to the field of lighting and/or light-signaling for motor vehicles. More specifically, the invention relates to the field of screens integrated into motor vehicle lighting or light-signaling lighting modules.

It is known practice to integrate screens into motor vehicle lighting modules, for example into tail lights. These screens are for example made up of arrays of a large number of selectively activatable light sources, the dimensions of which are small enough for it to be possible to display, on these screens, information for example in the form of messages or pictograms, with a satisfactory resolution. Such information thus makes it possible to improve the signaling given by the motor vehicle, for example by contextualizing a given signaling function or displaying an accompanying message. For comfort and safety reasons, it is however necessary to integrate the screen into the lighting module in such a way that the visible appearance of the screen is uniform, for comfort reasons, and in such a way that the screen and the information displayed thereon are visible in a wide field of view.

Furthermore, motor-vehicle esthetics impose certain constraints on the integration of the screen. Specifically, in order to fit in with the modern look of motor vehicles, motor vehicle tail lights and headlamps nowadays have an outer lens that is highly curved, and this has a strong impact on the shape of the internal components.

In order to meet these various constraints, there has been the idea of curving the screen to give it a convex shape so as to mimic the curvature of the outer lens and obtain a surface that is visible in a wide field of view, and with an appearance that is uniform. For all that, known screen technologies, for example LCD screen technologies, because of the substrates used for mounting and operating their light sources, are unable to meet this need for curvature. In particular, these technologies are not suitable for small radii of curvature, because then the protection of the various intermediate layers of these substrates, which is normally afforded by the outer layers, is no longer optimal. Conversely, OLED-type screen technologies do enable curved screens to be obtained, but do not offer the durability required for the automotive field. As a result, the screens may suffer from corrosion from the internal environment of the tail light, or of the headlamp, for example as a result of moisture, temperature, sulfur or chlorine derivatives, which may infiltrate into the interfaces between these intermediate layers.

In addition, particles may happen to contaminate the screen, notably during the assembly of a module comprising a screen in a signaling device. Such particles may generate visual disturbances or even cause the screen to fail. That means that a large majority of the assembly operations need to be carried out under environmental conditions that avoid contamination, but are costly.

Finally, it is desirable to integrate this screen into a lighting module while giving it a floating appearance, which is to say an appearance whereby the edges have no visible means of electrical connection and/or of mechanical retention. Nevertheless, it is necessary to provide a means that allows each of the light sources of this screen to be selectively controlled.

There is thus a need for a motor vehicle lighting module incorporating a screen that can be curved in order to give it a convex shape and that has a floating appearance. The invention falls within this context and aims to meet this need.

To these ends, one subject of the invention is a lighting module for a motor-vehicle signaling device, comprising:
 a substrate comprising an electronic circuit, an interior face facing toward the interior of the vehicle and an exterior face facing toward the exterior of the vehicle,
 a matrix array of elementary light sources arranged on the electronic circuit of the substrate, the elementary light sources being positioned on the exterior face of the substrate,
 a wall designed to allow at least some of the light emitted by said light sources to pass through and comprising an exterior face facing toward the exterior of the device and an interior face facing toward the interior of the device,
 said interior face of the wall comprising a bonding zone,
 the exterior face of said substrate and/or all or part of said elementary light sources being bonded to said bonding zone of the interior face of the wall.

What is meant by a bonding zone is a zone on the interior face of the wall that is able to act as a support for the bonding of the exterior face of the substrate. Said bonding operation may comprise a step of applying a coat of adhesive to all or part of the substrate and/or to all or part of the elementary light sources, and then a step of bringing the substrate and/or the adhesive-coated elementary light sources into contact with the bonding zone. Conversely, it may comprise a step of applying a coat of adhesive to all or part of the bonding zone of the wall and then bringing the adhesive-coated bonding zone into contact with the elementary light sources and/or the substrate. Moreover, it will be appreciated that the elementary light sources are arranged on the exterior face of the substrate in such a way as to be visible from the exterior of the vehicle.

As a preference, adhesive may be applied to the entire arrangement of elementary light sources and to part of the substrate. Alternatively, adhesive may be applied to a part of the substrate that surrounds the arrangement of elementary light sources.

Because all or part of the exterior face of the substrate and/or of the light sources is bonded to the bonding zone, the arrangement of light sources is protected from moisture and corrosion phenomena, notably those caused by moisture, temperature, and sulfur or chlorine derivatives. In the same way, the arrangement of light sources is also protected from dust. The assembled module is therefore easy to handle for subsequent operations of assembling it into the signaling device, without requiring costly environmental conditions.

Advantageously, the exterior face of the wall of the lighting module is situated external to the motor vehicle. In that way, an intermediate wall between the lighting module and the exterior is absent, making it possible to avoid additional material costs and to circumvent the problems of parasitic reflections engendered by the presence of an intermediate wall and to circumvent the problems of condensation which are often encountered in automotive lighting. Alternatively, the module is kept inside the signaling device. When the wall is transparent, this means that the module can be fixed in place via its wall in such a way as to create the impression of a lighting module within the signaling device.

Advantageously, the light sources are positioned uniformly on the electronic circuit of the substrate with a spacing interval of less than 1 mm. That allows better definition of the lighting patterns displayed by the lighting module while at the same time keeping these patterns suitably uniform.

Advantageously, the substrate may be flexible and the interior-wall part to which the substrate is bonded may be curved. As a preference, the substrate mimics the shape of the bonding zone, which is to say adopts a shape that complements that of the bonding zone. Such a shape allows all or part of the exterior face of the substrate and/or all or part of the elementary light sources to be bonded to the bonding zone with a constant spacing between the exterior face of the substrate and the interior face of the wall. In that way, there is no need to pre-shape the substrate to the shape of the wall. In particular, the interior-wall part to which the substrate is bonded may be of convex overall shape, from the viewpoint of an observer situated external to the motor vehicle, which is to say that, for the majority of the interior wall, a straight-line segment joining any two points on the interior wall will never pass through the interior wall. As a preference, the interior wall may have a radius of curvature of between 90 mm and 500 mm. That means that the surface of the module will be visible from a wide field of view. Thus, such a module can easily be used in a vehicle signaling light that has a curved outer lens. Alternatively, the substrate may be produced in a material that has been pre-shaped to conform to the bonding zone. In particular, a substrate of the flexible multilayer type (having for example 1 to 4 layers) (and known by those skilled in the art as an FPC, which stands for "Flexible Printed Circuit") may be used for this purpose so that it conforms to the shape of the bonding zone. In particular, a substrate of organic type (known by those skilled in the art as a 3D-MiD, which stands for "3D Mechatronic Integrated Device") may be used for that purpose.

Advantageously, the substrate is made of ceramic. What is meant by a ceramic substrate is a substrate made from a material of crystalline or partially crystalline or amorphous structure, such as a glass or an alumina, the body of which is made up of essentially inorganic substances and which is formed by a molten mass that solidifies as it cools, or which is formed and brought to maturity, at the same time or subsequently, through the action of heat and/or pressure. Advantageously, the ceramic substrate is a substrate made of alumina (Al2O3) or else of aluminum nitride (AlN). As a preference, the ceramic substrate is a glass substrate (for example based on borosilicate glass); such a substrate has good dielectric properties for a low production cost.

Advantageously, each of the light sources comprises at least one light-emitting semiconductor chip with dimensions comprised between 80 µm and 300 µm. Such a chip notably comes under the heading of miniLED. In a variant, each of the light sources comprises at least one light-emitting semiconductor chip with dimensions comprised between 5 µm and 80 µm. Such a chip notably comes under the heading of microLED. Where applicable, the light sources may be mounted directly or indirectly on the exterior face of the ceramic substrate, notably such that two adjacent light sources are distant by a maximum of 1 mm.

If desired, the electronic circuit of the substrate comprises a part arranged on the interior face of the substrate and forming an interior interconnection layer and/or a part arranged on the interior face of the substrate and forming an interior interconnection layer. These interconnection layers may comprise a network of conducting tracks. Where applicable, the network of conducting tracks of the exterior interconnection layer may be connected to each of the light sources. If desired, and when the electronic circuit of the substrate comprises an interior interconnection layer and an exterior interconnection layer, the thickness of the exterior interconnection layer may be substantially equal to the thickness of the second interior interconnection layer.

Advantageously, the substrate comprises a plurality of through-holes. The use of through-holes or vias, also known as TGVs (Through Glass Vias) when the substrate is made of glass or another ceramic, allows components situated on one side of the substrate to be connected to components situated on the other side of the substrate.

Advantageously, each of the through-holes is provided with internal plating of an electrically conducting material that is connected simultaneously to an interior and exterior interconnection layer. In a variant, each of the through-holes is filled with an electrically conducting material that is connected simultaneously to an interior and exterior interconnection layer. For example, the electrically conducting material may be copper. The use of copper notably makes it possible, in addition to affording electrical connection, to transfer the heat emitted by the light sources from one side of the substrate to the other side of the substrate, for example to a heatsink. It should be noted that the through-holes increase the thermal conductivity of the substrate, by forming parallel-connected thermal resistances which advantageously modify the heat-conducting properties of the substrate.

According to a first variant, the exterior face of the substrate comprises a bent-over part that is not bonded and that is not provided with bonded elementary light sources, said part forming a support for non-lighting components. In that way, components can be added to the exterior face of the substrate which already bears the elementary light sources, affording a saving in terms of cost of materials and of components.

According to a second variant, the interior face of the substrate forms a support for non-lighting electronic components. In that way, it is possible to arrange non-lighting components on the interior face of the substrate, thereby allowing these to be concealed from view from the viewpoint of an observer situated external to the vehicle. When the substrate comprises through-holes able to carry current from one side of the substrate to the other, this allows shorter connections between the non-lighting components mounted on the interior face of the substrate and the elementary lighting sources mounted on the exterior face of the substrate.

In either of the first and second variants, the support of non-lighting components may comprise a connector of the device providing electrical power to and/or control of the elementary lighting sources and/or a demultiplexing device and/or a control device for the elementary light sources.

Advantageously, the adhesive covers the entirety of the exterior face of the substrate. In the first variant, that entails selecting non-lighting components that are compatible with the constraints notably of height as defined by the thickness of the adhesive used, and the thermal constraints. In the second variant, this is made easier because only the elementary light sources are present on the exterior face of the substrate.

Advantageously, the surface of the substrate comprises spacers designed to ensure a constant distance between the exterior face of the substrate and the bonding zone of the wall, and/or between the elementary light sources and the bonding zone of the wall. These spacers may be assembled on the substrate in zones that are not fitted with light sources and/or in zones that are not fitted with active control elements.

Advantageously, the spacers are arranged uniformly among the light sources. For example, spacers may be arranged between each of the elementary light sources. In another example, spacers are positioned at the nodes of mesh patterns of a matrix array comprising several sources. For example, the light sources are positioned in an orthogonal matrix array, and the mesh patterns are rectangles measuring 6 sources in one direction by 4 sources in another direction. The corners of these rectangles are nodes of mesh patterns and one source is positioned at each of these nodes. Other patterns may of course be used for other types of arrangement of elementary light sources. The use of spacers is particularly relevant in instances in which the adhesive is of the silicone type.

Advantageously, when the lighting module comprises spacers, the spacers are translucent or transparent so as to minimize the reflections of light that could give rise to visual disturbances, for example a reflection of light from one light source off an adjacent wall, which could give the impression that other light sources are illuminated. This then improves the contrast perceived by an observer external to the vehicle between a zone comprising light sources of the matrix array, which sources are switched off, and light sources from the same matrix array but which are illuminated.

The dimensions and appearance of the spacers are tailored to guarantee certain switched-off and illuminated appearances of the module. As a preference, the spacers ensure a minimum distance equivalent to the sum of the thickness of the mini-LED and of its means of attachment to the substrate, plus a thickness corresponding to a minimum thickness of adhesive above a light source. In one example, the light sources are of mini-LED type and the spacers have a rectangular footprint on the substrate (for example measuring 80 μm×150 μm) which is equivalent to that of one of the mini-LEDs and a thickness (for example 160 μm) that is greater than that of the mini-LED.

Advantageously, partition walls are arranged on the exterior face of the substrate. What is to be understood by a "partition wall" is an element that is positioned in such a way as to act as a divider in a layer of adhesive covering two adjacent LEDs for example. The partition walls make it possible to reduce movement and mechanical stress caused by expansions of the materials of which the module is made, particularly expansions of the adhesive and of the substrate, of the adhesive and of the wall, or of the wall and of the substrate, under the effect of the temperature variations to which the module may be subjected. It will be appreciated that the term expansion also covers contractions of the materials which may take place under the influence of temperature variations. Such movements and such stresses may give rise to problems with reliability: by limiting the movements, the partition walls allow the reliability of the lighting module to be improved.

Advantageously, the lighting module comprises partition walls forming a grating, commonly referred to as a spider, on the substrate. Such a grating allows elements on large-sized substrates to be partitioned with ease. In that way, it is possible to manufacture a lighting module of large dimensions without these dimensions leading to stress problems associated with differential expansions, even when the materials of the lighting module have very different expansion behaviors.

Advantageously, when the lighting module comprises partitions, the partitions are translucent or transparent so as to minimize the reflections of light that could give rise to visual disturbances, for example a reflection of light from one light source off an adjacent partition, which could give the impression that other light sources are illuminated. This then improves the contrast perceived by an observer external to the vehicle between a zone comprising light sources of the matrix array, which sources are switched off, and light sources from the same matrix array but which are illuminated.

As a preference, the partitions are compressible, which is to say can be compressed in order to compensate for movements caused by expansions of the materials of which the module is made, particularly expansions of the adhesive and of the substrate under the effect of the temperature variations to which the module may be subjected. Alternatively, the partitions have an expansion coefficient that makes it possible to compensate for the differences in expansion, for example between the adhesive and the substrate.

In one particular embodiment, the lighting module comprises partitions that also act as spacers. In that way, the advantages of these two functions are achieved through a reduced number of elements, making it possible to reduce the costs and bulkiness associated with these functions.

In either of the first and second variants, the matrix array of elementary light sources is preferably a uniform arrangement and may cover over 90% of that part of the exterior face of the substrate that is visible from the viewpoint of an observer external to the vehicle and situated above the height of the signaling device relative to the ground. In that way, a "floating" appearance of the lighting module is obtained from the usual viewpoints of observers external to the vehicle.

Advantageously, regions of the interior face of the wall are opacified. An opacified region of the interior face transmits less visible light than a non-opacified region. In that way, the appearance of the lighting module when elementary lighting sources are switched off is improved, non-lighting components are concealed from the view of an external observer, and the effects of parasitic reflection of the light from the light sources are limited.

Advantageously, the elementary light sources may be activated or deactivated individually. Alternatively, the elementary light sources are split into a plurality of groups which can be activated or deactivated. For example, the groups of elementary light sources may form predefined patterns of light.

Advantageously, the bonding is performed using an adhesive that is transparent and/or translucent and/or that forms a colored filter. An adhesive that is transparent makes it possible to enable better perception of the elementary light sources, allowing better fineness of the display. An adhesive that is translucent allows a significant proportion of the light from the light sources to pass through without making it possible to discern the individual light sources, thereby improving the perceived uniformity of the lighting module when contiguous elementary light sources are illuminated. An adhesive that forms a colored filter makes it possible to absorb light of a given color notably so as to improve the appearance of the device when light sources are switched off. The light sources emit red light only and the colored filter allows only red light to pass and blocks the other colors. Any non-red light illuminating the lighting module is therefore blocked, so that it is not reflected by the substrate and a switched-off appearance of the lighting module is therefore improved. In addition, the red light from the elementary light sources is not blocked, thus preserving the optical efficiency of the lighting module.

Advantageously, a silicone-based adhesive is employed. Such an adhesive offers properties of elasticity allowing a small thickness of adhesive to absorb differences in expansion of the materials of the substrate and of the wall. Furthermore, such an adhesive offers thermal characteristics that guarantee its integrity and longevity when subjected to temperatures of operation of the module in a motor vehicle signaling device.

As a preference, a silicone-based adhesive of the dimethyl (also known as a polydimethylsiloxane) type is employed. Such an adhesive has a glass transition temperature of the order of −50° C., thereby ensuring its properties over the entirety of the intended temperatures in which a motor vehicle signaling device is used.

Advantageously, the adhesive is made up of several layers. Advantageously, the adhesive has a primary layer and a secondary layer. The primary layer is applied to the substrate, and covers the matrix array of light sources. As a preference, the primary layer is free of bubbles. The primary layer protects the substrate and the light sources notably against corrosion, debris from the environment and mechanical stresses associated with the bonding. As a preference, the primary layer forms an entirely smooth surface on top of the substrate. Alternatively, the primary layer forms a smooth surface from which only the spacers protrude. The secondary layer is intended to bond the primary layer to the wall. As a preference, this is a layer of small thickness (comprised between 10 and 100 µm, for example 50 µm). For example, the adhesive consists of a protective layer fully encapsulating the components mounted on the exterior face of the substrate and of an adhesive layer applied to the protective layer and configured to provide the bonding to a bonding zone of the wall.

When the adhesive comprises several layers, it must be appreciated that it is possible to add layers and to vary the composition thereof according to the intended function of this layer. For example, one layer of the adhesive may have expansion behavior that makes it possible to reduce mechanical stresses attributable to expansions of the substrate and/or of the wall and/or of the adhesive. It will be appreciated that a layer of adhesive may be made of any material onto which at least one adhesive layer and/or one protective layer can be applied.

As a preference, an adhesive made up of a plurality of layers may comprise one or more layers of silicone-based or of polydimethylsiloxane-based adhesive. In particular, when several layers are made of silicone, the mutual chemical compatibility of the layers is improved and so too is their thermal compatibility, because adhesives with similar compositions exhibit similar expansion behavior.

According to one embodiment of the invention, each light source is arranged on the electronic circuit of the substrate at a through-hole. When the electronic circuit comprises an exterior interconnection layer, the elementary light source may be arranged on said exterior interconnection layer. As a variant, the plurality of light sources is split into a plurality of groups of light sources, notably mounted in series, and each group of light sources is arranged on the electronic circuit of the substrate in association with a through-hole.

According to another embodiment of the invention, each light source is arranged on the electronic circuit of the substrate on the upper face of the substrate and the vias are used at the edge of the substrate to avoid having connectors on the upper side.

According to a third embodiment of the invention, each light source is arranged on the electronic circuit of the substrate on the upper face of the substrate and there is a connector on the upper part of the substrate.

Advantageously, the module comprises a connector able to receive a instruction for the control of said light sources and a control unit designed to selectively control each of the light sources on the basis of said control instruction received by the connector. For example, the light sources are arranged on the substrate in a matrix array and the control unit is designed to address and control each of the light sources according to its position within said matrix. For example, on receipt of a control instruction, the control unit may be designed to scan the matrix vertically, successively selecting each row of the matrix, notably by applying a selection voltage to each of the rows in succession; and, for each row selected during the scan, to simultaneously apply, on the basis of the control instruction, an activation or deactivation signal to each column of the matrix so as to cause or prevent the emission of light by the light source addressed by the selected row and this column. The number of tracks in the connector which are needed for addressing each of the light sources is thus equal to the sum of the number of rows and of columns.

As a preference, the connector comprises an adhesive anisotropic conductive film, the connector being mechanically connected to the electronic circuit of the substrate by means of said adhesive anisotropic conductive film. The connector is thus a connector of ACF (Anisotropic Conductive Film) type.

Advantageously, the connector may be mounted on a support for non-lighting components, notably on the interior face or the exterior face of the substrate, notably at an edge of said face.

Advantageously, the connector may comprise a flexible printed circuit board, the control unit being mounted directly on said flexible printed circuit board. This type of arrangement is also known as CoF, which stands for Chip on Flex. As a variant, the control unit may be mounted on a support for non-lighting components on the interior face and/or on the exterior face of the substrate, notably by means of an adhesive anisotropic conductive film or, as a variant, may be incorporated into a Ball Grid Array, also known as a BGA. When the substrate is made of glass or another ceramic, this type of arrangement is also known as Chip on Glass, or CoG. If desired, a plurality of control units and/or a plurality of connectors may be provided.

Advantageously, the connector may be mounted on the interior face of the substrate. It will be appreciated that if the connector is mounted on the exterior face of the substrate, its height will protrude beyond the height of the light sources, and this will impose constraints on the production of the lighting module. For this reason, it is advantageous for the connector to be mounted on the interior face, so as not to interfere with the optical surface.

In one embodiment of the invention, the lighting module comprises a plurality of active control elements, each active control element being designed to control one of the light sources with which it is associated and being mounted on the exterior face at one of the through-holes so as to be connected to an interior interconnection layer of the substrate, said plurality of active control elements forming an active matrix and the control unit being designed to control said active matrix on the basis of said control instruction received by the connector.

In other words, the control unit is able to control each light source by addressing and controlling the associated control element. What is notably meant by an active control element is the fact that each control element is designed to actively maintain the associated light source in the illuminated or switched-off state while the active matrix is being scanned by the control unit.

Advantageously, each of the light sources comprises at least one light-emitting part of OLED type. In that case, the lighting module preferably comprises active control elements associated with the light sources and thus forming an active matrix so as to create a display of the AMOLED type.

Advantageously, each light source is mounted on and connected to the control element with which it is associated. For example, each control element comprises a thin film transistor, also known as a TFT, on which the associated light source is mounted and to which same is connected. If so, all of the plurality of light sources and of the plurality of active control elements form an active matrix.

In a variant, the electronic circuit of the substrate may comprise one or more connection thin layers, notably of a thickness less than 50 μm, incorporating a plurality of active control elements, each active control element being designed to control one of the light sources with which it is associated, and each light source is mounted on and connected directly to the electronic circuit of the substrate, substantially in line with a control element of the connection thin layer or layers, to which it is connected. Each active control element may for example be of the microelectronic circuits type, comprising at least one transistor and one memory. If so, all of the plurality of light sources and the connecting thin sublayer or sublayers incorporating the plurality of active control elements form an active matrix.

As a further variant, the lighting module comprises a plurality of active control elements, each active control element being designed to control one or a plurality of the light sources with which it is associated and being mounted directly on an exterior interconnection layer of the substrate, and each light source is mounted on and connected directly to said exterior interconnection layer of the substrate while being connected to the associated active control element. Advantageously, the electronic circuit of the substrate may comprise one or more sublayers. Each active control element may for example be of the microelectronic circuit type, comprising at least one transistor and one memory. If so, all of the plurality of light sources and of the plurality of active control elements form an active matrix.

In another embodiment of the invention, each light source is mounted directly on the electronic circuit of the substrate, the plurality of light sources forming a passive matrix and the control unit being designed to control said passive matrix on the basis of the control instruction received by the connector. If so, the lighting module may comprise a plurality of devices controlling the supply of electrical power to the light sources, the devices controlling the supply of electrical power being mounted on an interior interconnection layer of the substrate. For example, each control device may be mounted on the interior face of the ceramic substrate at a through-hole, said control device being designed to control the supply of electrical power to the light source mounted at said through-hole.

Advantageously, the lighting module comprises an opaque coating applied to the exterior face of the substrate. For example, the opaque coating may be formed on an exterior interconnection layer of the substrate and may be provided with openings formed at the location of the light sources. If so, the opaque coating may be applied before the components are mounted on the exterior face of the ceramic substrate, notably by using a mask. As an alternative, the opaque coating may be applied after said components have been mounted. As a preference, the opaque coating may be a dark color with a matt appearance. This coating notably makes it possible to avoid what are known as parasitic reflections of rays of light emitted by the light sources toward the substrate and thus improves the contrast—something which is desirable when the ambient lighting is very bright.

In one of the embodiments, the interior face of the substrate is advantageously in thermal contact with a heat sink member made from a thermally conducting material, notably from aluminum or copper. Such a member may have fins or pins for dissipating heat. The heat sink member may also comprise a thermal interface thus allowing heat to be transmitted between the interior face of the substrate and the heat sink member. As a preference, such an interface is formed from a material that has particular thermal conductivity properties, notably a thermal conductivity coefficient in excess of 1 W/m/° C., able to fill the clearances and spaces between the interior face of the substrate and the heat sink member. In one embodiment, this thermal interface is produced using an adhesive, thus holding the heat sink member in place. In that way, it is possible for the lighting module to be held in place fully via its wall. In another example, a support member held by the signaling device or directly by the vehicle provides the retention of the heat sink member. This support member may also support electrical interfaces of the lighting module, such as a flexible printed circuit board and/or a control unit.

A further subject of the invention is a motor vehicle light signaling device comprising a light module according to the invention. If desired, the signaling device may be configured as a tail light of the motor vehicle.

Figure 2:
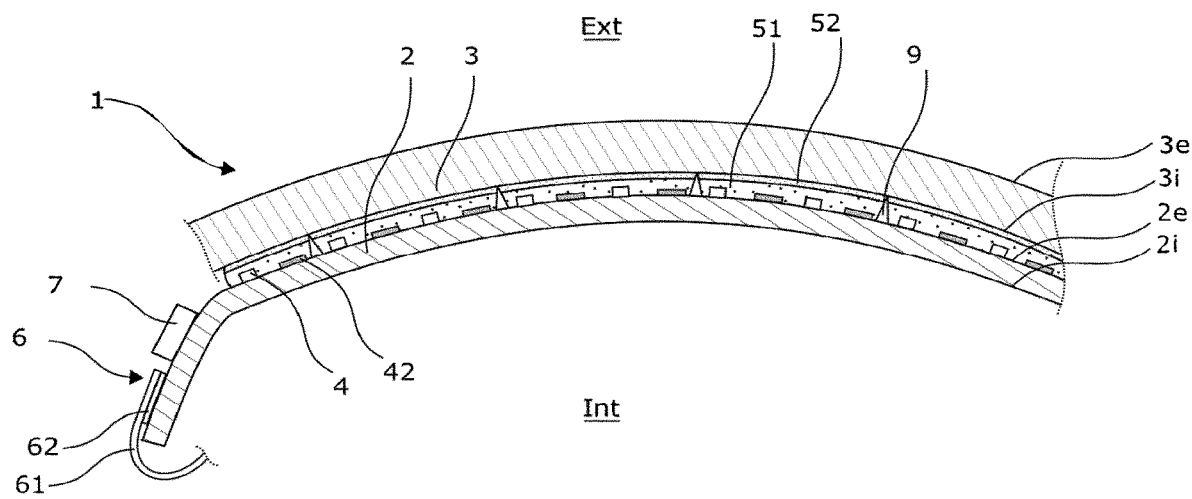

The present invention will now be described by way of examples that are merely illustrative and that in no way limit the scope of the invention, and with reference to the accompanying illustrations, in which:

FIG. 1 schematically and partially depicts a sectional view of a lighting module according to a first embodiment of the invention;

FIG. 2 schematically and partially depicts a sectional view of a lighting module according to a second embodiment of the invention;

In the following description, elements that are identical in terms of structure or in terms of function and that appear in various figures have been designated with the same reference sign, unless otherwise indicated.

FIG. 1 depicts a partial view of a lighting module 1 according to a first embodiment of the invention. This lighting module 1 forms part of a tail light of a motor vehicle.

The lighting module 1 comprises a plurality of light sources 4 mounted on an exterior face 2e of a glass substrate 2. Each of the light sources 4 comprises at least one light-emitting semiconductor chip with dimensions comprised between 5 μm and 80 μm. The light sources 4 are mounted on the exterior face 31 in a matrix array such that two adjacent light sources 4 are distant by a maximum of 1 mm.

In order to control these light sources 4 selectively, the exterior face 2e of the glass substrate 2 is provided with an exterior interconnection layer, not depicted, comprising a network of electric tracks made of copper and electrically connected to the light sources 4. Symmetrically, the interior face 2i of the glass substrate 2, which is the opposite face to the exterior face 2e, is likewise provided with an interior interconnection layer, not depicted, comprising a network of electric tracks made of copper and of a thickness substantially identical to that of the first layer. The glass substrate 2 comprises a plurality of through-holes 41, each of the through-holes being provided with an internal coating made of copper so that the interconnection layers can be interconnected.

The elementary light sources 4 together with part of the exterior face 2e of the substrate 2 are bonded to the interior face 3i of the wall 3. The adhesive 5 encapsulates the light sources 4 and the entirety of the exterior face 2e of the substrate 2. The adhesive 5 is a transparent silicone-based adhesive. In that way, the transmission of the light and the fineness of the displayed image are improved. In addition, the use of a silicone adhesive of sufficient thickness, for example with a thickness comprised between 10 µm and 200 µm, and a substrate 30 mm to 100 mm wide, makes it possible to absorb differences in expansion of the materials of the substrate and of the wall.

The substrate on its interior face has a connector 6. In order to be mechanically connected to the glass substrate 2 and electrically connected to the interior interconnection layer, the connector 6 has an adhesive anisotropic conductive film 62 fixed to a flexible printed circuit board 61. The film 62 thus allows the board 7 to be fixed at an edge of the interior face 2i of the glass substrate 2 while at the same time electrically connecting this board to the interior interconnection layer.

The lighting module 1 further comprises a control unit 7 designed to selectively control the active matrix on the basis of the control instructions received via the connector. In the example described, the control unit 7 is mounted directly on the flexible printed circuit board 61.

The lighting module 1 further comprises a heat sink member 8. In the embodiment depicted, the heat sink member 8 has fins 81 and a thermally conducting adhesive 82 that holds the substrate 2 and the heat sink member 8 and fills the clearances and spaces between them, while at the same time transmitting heat between the substrate 2 and the heat sink member 8.

It may be observed from [FIG. 1] that the glass substrate 2 has a convex curved shape, from the viewpoint of an observer situated outside the motor vehicle. In order to be able to shape this glass substrate 2 into this convex curved shape, the substrate 2 has a thickness of between 100 µm and 200 µm, making it flexible and thus allowing it to be given a curvature with a radius of curvature of between 90 mm and 500 mm, without the risk of weakening the various components mounted on this substrate 2, particularly on the interior face 2i.

FIG. 2 depicts a partial view of a lighting module 1 according to a second embodiment of the invention. This lighting module 1 forms part of a tail light of a motor vehicle.

Unlike in the embodiment of [FIG. 1], the substrate has no through-holes. Active control elements 42 are situated on the exterior face of the substrate. The substrate has an exterior interconnection layer, not depicted. This interconnection layer comprises a network of electrical tracks which connects the light sources 4 to the control elements 42. Each light source 2 is mounted directly on the exterior interconnection layer. The lighting module 10 comprises a plurality of control devices 42 controlling the supply of electrical power to the light sources 2, each control device 42 being mounted on the face 2e of the glass substrate 2 in order to control the supply of electrical power to a neighboring light 4 via the interconnection layer. The plurality of light sources 2 thus forms a passive matrix screen.

As in the embodiment of [FIG. 1], the sources 4 and the substrate 2 are bonded to the interior face 3i of the wall 3. However, a portion for supporting non-lighting components on the exterior face 2e of the substrate 2 is not bonded, so that it can be folded back in order to be able to accommodate non-lighting components such as the connector 6 and the control unit 7 which are too tall to be bonded.

The adhesive 5 comprises a protective layer 51 encapsulating the light sources 4 and an adhesive layer 52 applied on top of the protective layer 52. The protective layer protects the light sources and the other components on the substrate from mechanical stresses and from corrosion and creates a flat surface to which is applied the adhesive layer that bonds to the bonding zone of the wall 3.

Partition walls 9 are arranged on the exterior face 2e of the substrate 2. These partition walls are intended to create partitioned zones in the adhesive (for example, in the entire thickness of the adhesive or, for example, in one layer of adhesive) to limit movement and mechanical stresses (particularly shear stresses) caused by the expansions of the substrate 2, of the layers of adhesive 51 and 52, and of the wall 3. They also act as spacers and keep the exterior face of the substrate and the bonding zone of the wall 3 at a constant distance from one another.

The elementary light sources 4 emit red light only. The adhesive 5 is translucent and forms a colored filter. The colored filter allows only red light to pass and blocks the other colors. Any non-red light illuminating the lighting module 1 is therefore blocked, so that it is not reflected by the substrate 2 and a switched-off appearance of the lighting module 1 is therefore improved. In addition, the red light from the elementary light sources 2 is not blocked, thus preserving the optical efficiency of the lighting module 1. The translucent adhesive 5 additionally renders the contours of the sources difficult to discern, further improving the uniform appearance of the device when switched off and thus further improving the switched-off appearance.

Moreover, the control unit 7 is incorporated into a ball grid array which is mounted on the exterior interconnection layer to control the elementary light sources on the basis of the control instructions received by the connector.

The foregoing description clearly explains how the invention is able to achieve its stated objectives, notably by offering a lighting module comprising a plurality of light sources which are mounted on a substrate bonded to a transparent wall of the lighting module. In that way, accidental contamination of the substrate with dust is avoided, and the module can be handled without requiring costly environmental conditions. Furthermore, the use of a flexible substrate makes it possible to obtain a curved module suitable for use in a signaling device of which the outer lens has a high level of curvature. Furthermore, the use of through-holes means that the light sources that make up the screen can be addressed selectively without the need for specific connection arrangements at an edge of the substrate which would be visible, it notably being possible for the connection arrangements to be positioned on a face of the substrate that is not visible. Thus a screen with a floating appearance can be created.

In any event, the invention should not be regarded as being limited to the embodiments specifically described in this document, and extends, in particular, to any equivalent means and to any technically operative combination of these means. It would be possible for example to envision affixing an opaque coating in a dark color and with a matt appearance to the exterior face of the substrate.

The invention claimed is:

1. A lighting module for a motor-vehicle signaling device, comprising:

a substrate comprising an electronic circuit, an interior face facing toward the interior of the vehicle and an exterior face facing toward the exterior of the vehicle, a matrix array of elementary light sources arranged on the electronic circuit of the substrate, the elementary light sources being positioned on the exterior face of the substrate, and a wall designed to allow at least some of the light emitted by said light sources to pass through and comprising an exterior face facing toward the exterior of the vehicle and an interior face facing toward the interior of the vehicle, wherein the interior face of the wall comprises a bonding zone, and in that all or part of the exterior face of said substrate and/or all or part of said elementary light sources is bonded to said bonding zone of the interior face of the wall, and the bonding zone of the interior face of the wall is curved and the substrate is flexible so that the substrate can conform to the shape of the bonding zone of the wall, and a straight-line joining any two points on the interior face of the wall never passes through the interior face of the wall, all or part of the substrate and/or all or some of the light sources is/are bonded to the bonding zone using an adhesive that forms a colored filter that allows only red light to pass and blocks the other colors, the interior face of the substrate is in thermal contact with a heat sink member that has at least one protruding fin, or partitions are placed on the exterior face of the substrate so as to create partitioned zones in the adhesive that are separated from each other by the partitions completely.

2. The module as claimed in claim 1, wherein the exterior face of the wall of the lighting device is situated on the exterior of the motor vehicle.

3. The module as claimed in claim 1, wherein the light sources are positioned uniformly on the electronic circuit of the substrate with a spacing interval of less than 1 mm.

4. The module as claimed in claim 1, wherein the bonding zone of the interior face of the wall is curved and the substrate is flexible so that the substrate conforms to the shape of the bonding zone of the wall, and a straight-line joining any two points on the interior face of the wall never passes through the interior face of the wall.

5. The module as claimed in claim 1, wherein the exterior face of the substrate comprises a non-bonded bent-over part without any light sources, said bent-over part forming a support for non-lighting components mounted on the electronic circuit of the substrate.

6. The module as claimed in claim 1, wherein:

the interior face of the substrate forms a support for non-lighting components mounted on the electronic circuit of the substrate, and the substrate comprises connecting elements passing through the substrate and making electrical connections between a part of the electronic circuit of the substrate, which part is situated on the interior face of the substrate, and a part of the electronic circuit, which part is situated on the exterior face of the substrate.

7. The module as claimed in claim 6, wherein the support for non-lighting components comprises a connector of the device providing electrical power to and/or control of the elementary light sources, and/or a control unit.

8. The module as claimed in claim 1, wherein the matrix array of elementary light sources is a uniform arrangement and covers over 90% of that part of the exterior face of the substrate that is visible from the viewpoint of an observer external to the vehicle and situated above the height of the signaling device relative to the ground.

9. The module as claimed in claim 1, wherein all or part of the substrate and/or all or some of the light sources is/are bonded to the bonding zone using an adhesive that is translucent and/or transparent and/or that forms a colored filter that allows only red light to pass and blocks the other colors.

10. The module as claimed in claim 1, wherein all or part of the substrate and/or all or some of the light sources is/are bonded to the bonding zone using a silicone-based adhesive.

11. The module as claimed in claim 1, wherein the interior face of the substrate is in thermal contact with a heat sink member that has at least one protruding fin.

12. The module as claimed in claim 1, wherein spacers are positioned on the exterior face of the substrate, said spacers being designed to maintain a constant spacing between the exterior face of the substrate and the bonding zone of the wall.

13. The module as claimed in claim 1, wherein partitions are placed on the exterior face of the substrate so as to create partitioned zones in the adhesive that are separated from each other by the partitions completely.

14. The module as claimed in claim 1, wherein the adhesive comprises a protective layer encapsulating the light sources mounted on the exterior face of the substrate and an adhesive layer applied to the protective layer and configured to provide the bonding to the bonding zone of the wall.

15. The module as claimed in claim 2, wherein the light sources are positioned uniformly on the electronic circuit of the substrate with a spacing interval of less than 1 mm.

16. The module as claimed in claim 2, wherein the bonding zone of the interior face of the wall is curved and the substrate is flexible so that it can conform to the shape of the bonding zone of the wall.

17. The module as claimed in claim 2, wherein the exterior face of the substrate comprises a non-bonded bent-over part without any light sources, said bent-over part forming a support for non-lighting components mounted on the electronic circuit of the substrate.

18. The module as claimed in claim 2, wherein:

the interior face of the substrate forms a support for non-lighting components mounted on the electronic circuit of the substrate, and the substrate comprises connecting elements passing through the substrate and making electrical connections between a part of the electronic circuit of the substrate, which part is situated on the interior face of the substrate, and a part of the electronic circuit, which part is situated on the exterior face of the substrate.

19. The module as claimed in claim 6, wherein the support for non-lighting components comprises a connector of the device providing electrical power to and/or control of the elementary light sources, and/or a control unit.

* * * * *